C. PALM.
TROLLEY RETRIEVER.
APPLICATION FILED SEPT. 22, 1908.
941,944.
Patented Nov. 30, 1909.
3 SHEETS—SHEET 3.
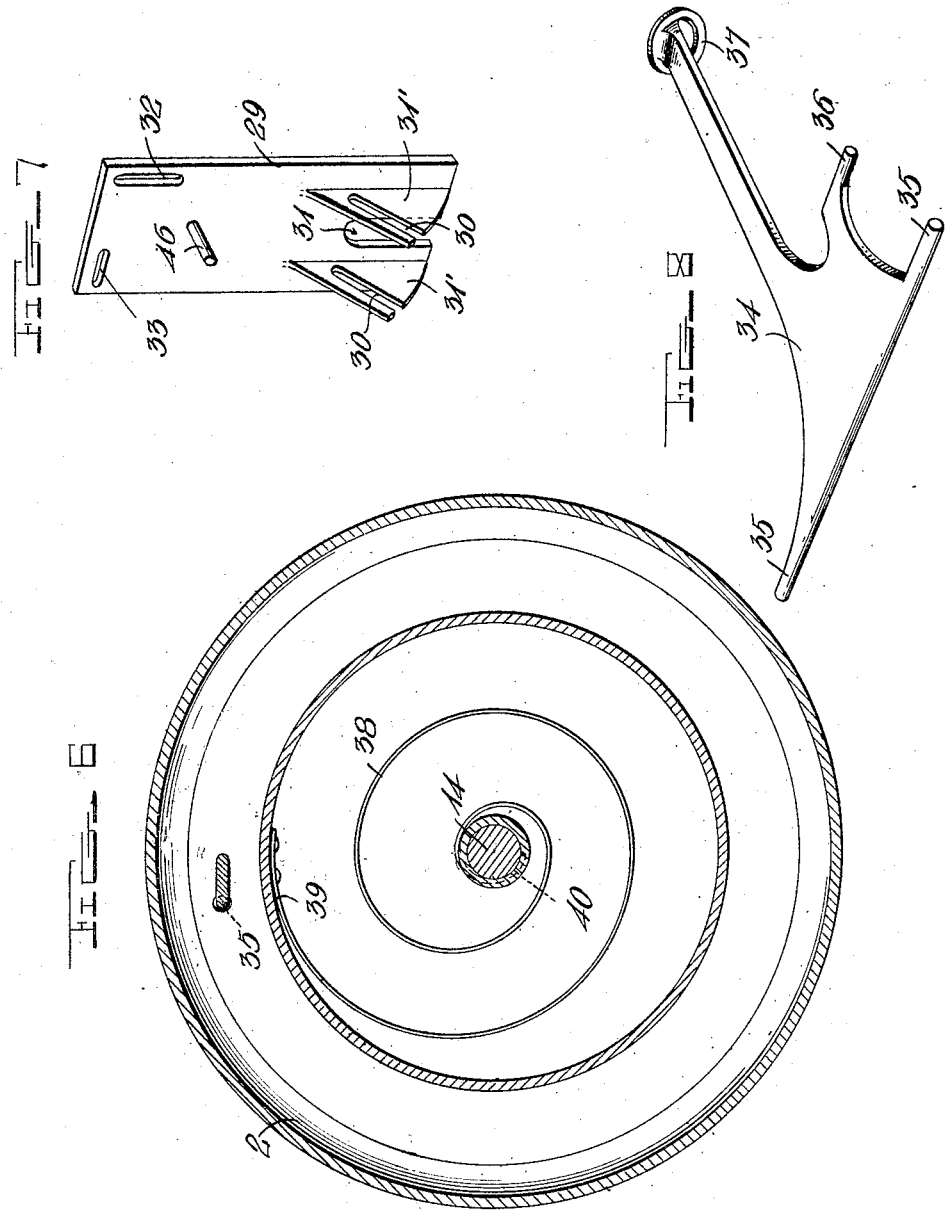

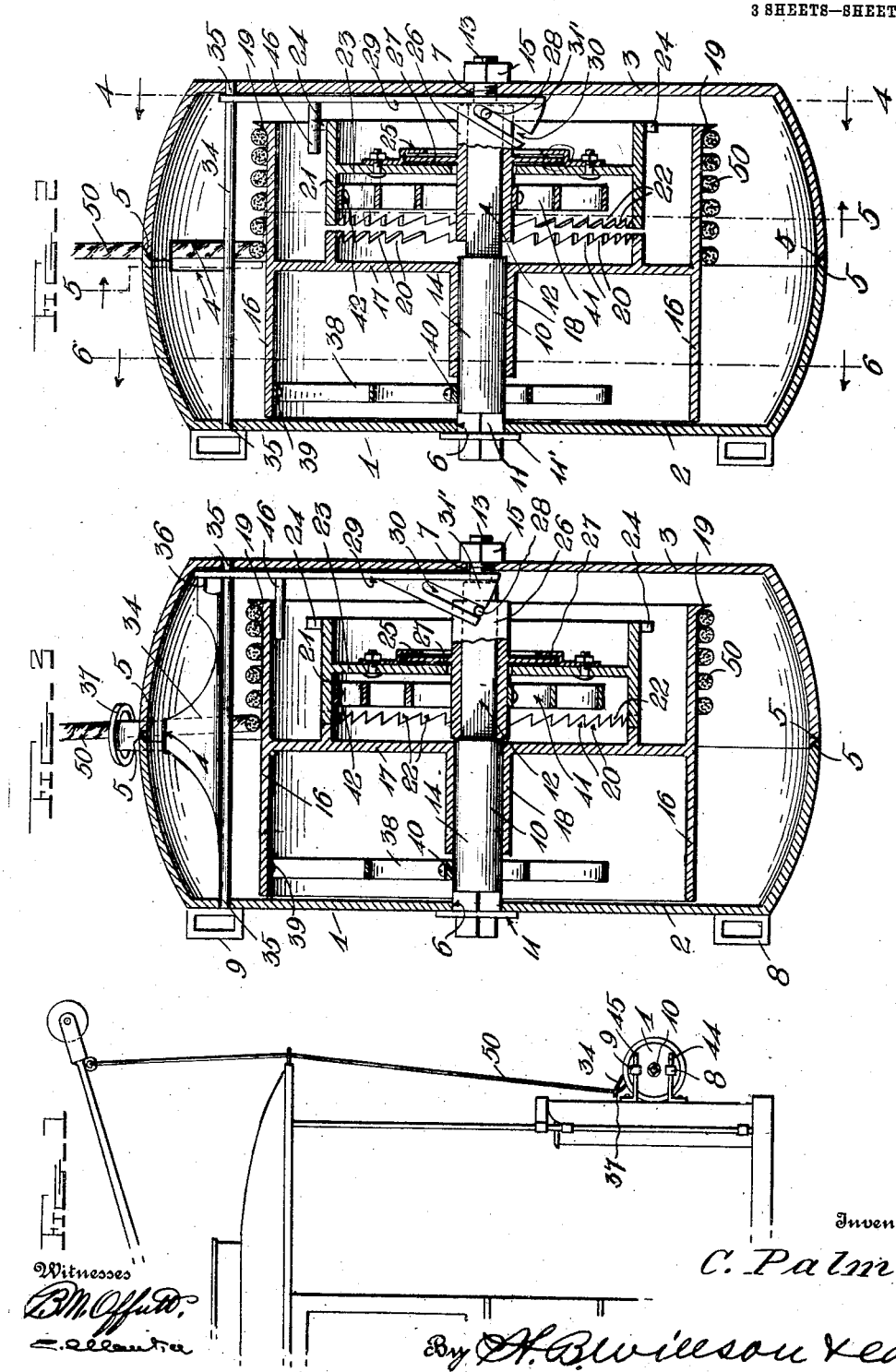

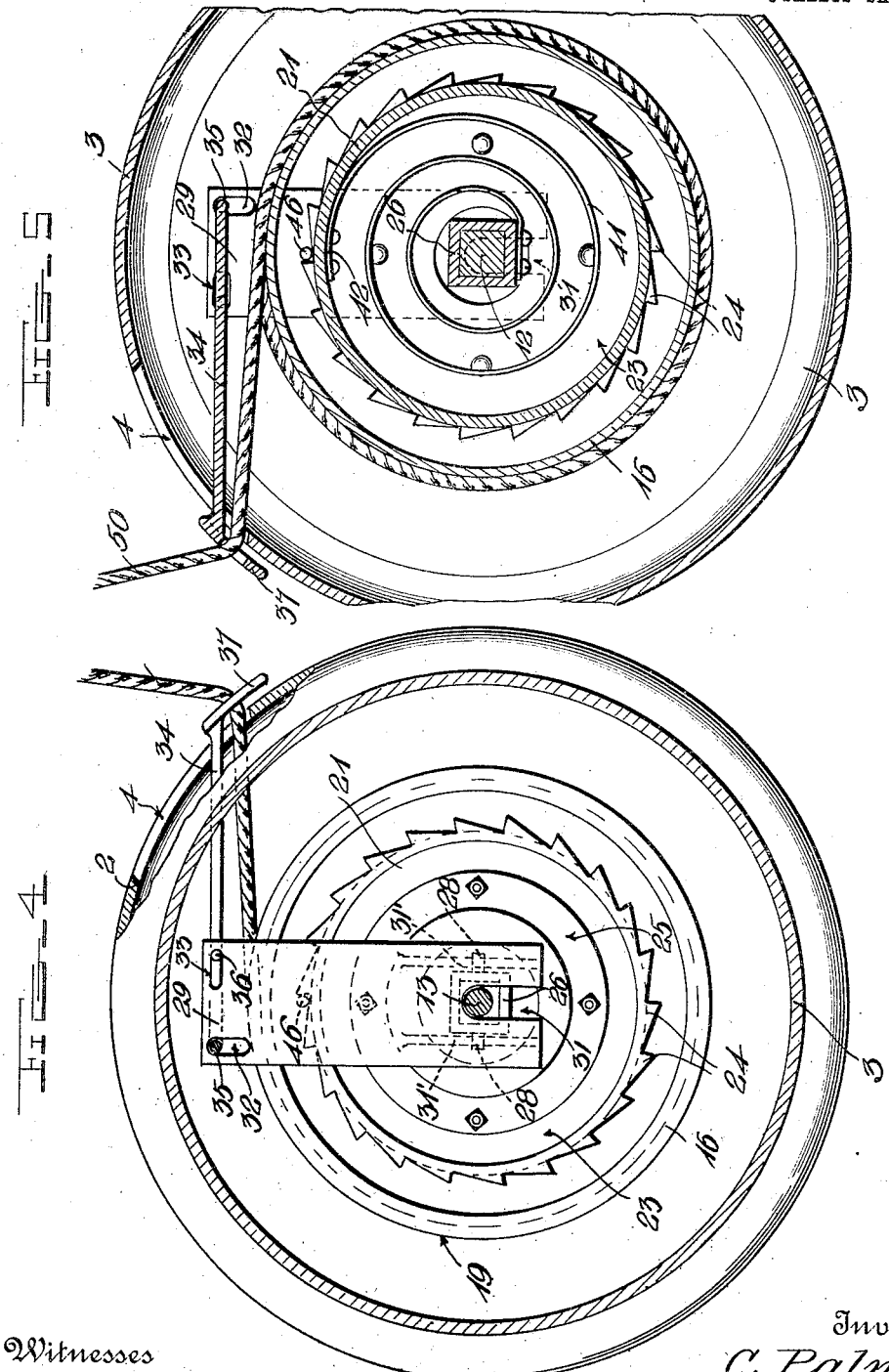

UNITED STATES PATENT OFFICE.

CHARLES PALM, OF AURORA, ILLINOIS.

TROLLEY-RETRIEVER.

941,944.

Specification of Letters Patent.

Patented Nov. 30, 1909.

Application filed September 22, 1908. Serial No. 454,186.

*To all whom it may concern:*

Be it known that I, CHARLES PALM, a citizen of the United States, residing at Aurora, in the county of Kane and State of Illinois, have invented certain new and useful Improvements in Trolley-Retrievers; and I do declare the following to be a full, clear, and exact description of the invention, such as will enable others skilled in the art to which it appertains to make and use the same.

This invention relates to trolley retrievers and contemplates the construction of a trolley retriever provided with a clutch held device adapted to lower a trolley to the roof of a car when said trolley jumps the trolley wire.

One object of the invention is to provide an improved trolley retriever which will automatically lower a trolley from engagement with a trolley wire.

Another object of the invention is to construct an automatic trolley retriever adapted to be mounted on a trolley car and connected with a trolley and so arranged when thus connected and mounted as to be brought into instantaneous action, when a trolley jumps its wire.

With the foregoing and other objects in view, the invention consists of certain novel features of construction, combination and arrangement of parts as will be more fully described and particularly pointed out in the appended claims.

In the accompanying drawings, Figure 1 is a side elevation of one end of a car equipped with this improved trolley retriever; Fig. 2 is a central sectional view thereof showing the retriever in its normal position; Fig. 3 is a similar view showing the retriever in operative position; Fig. 4 is a vertical section taken on line 4—4 of Fig. 2 and looking in the direction of the arrow; Fig. 5 is a vertical sectional view taken on line 5—5 of Fig. 2; Fig. 6 is a vertical sectional view taken on line 6—6 of Fig. 2; Fig. 7 is a perspective view of the operating plate detached; Fig. 8 is a similar view of the rope guide.

In the embodiment illustrated, a trolley retriever is shown comprising a housing 1 having two sections 2 and 3, each of which is formed with a cut-out portion 4 for affording a passage way for a rope and having double beveled edges, as 5.

The section 2 is provided with an angular aperture 6 adapted to receive the angular end of a shaft 10 to hold said shaft against turning. The section 3 is provided with a round aperture 7 arranged in alinement with the aperture 6 and adapted to receive the round threaded end 13 of the shaft 10, to be described. The section 2 is also provided with looped extensions 8 and 9, for a purpose to be described.

The shaft 10 which is mounted in the square aperture 6 and rounded aperture 7 of the sections 2 and 3 of the housing has one-half 12 thereof made angular in cross section and the other half 14 made cylindrical, for a purpose to be described. The squared end of the shaft 10 is provided with a shoulder 11 arranged outside of the section 1 which is adapted to abut against said section and prevent longitudinal movement of said shaft in one direction and the other end of the shaft is provided with a nut 15 mounted on the screw-threaded end 13 thereof which holds said shaft in adjusted position within the housing.

A drum 16 is mounted in the housing 1 and is of a length slightly less than the length of the housing as is clearly shown in Figs. 2 and 3. This drum 16 is provided with a centrally disposed inwardly extending web 17 having a laterally extending sleeve 18 at one side thereof adapted to rotate on the rounded portion 14 of the shaft 10. This drum 16 is also formed with a peripheral flange 19 and with an annular series of clutch teeth 20 carried by the web 17 on the side opposite the sleeve 18 and which constitute one member of a clutch. A sleeve 26 is mounted to slide on the angular portion 12 of the shaft 10 and is shaped to correspond with the shape of said angular portion to prevent turning of said sleeve on said shaft. A flange or shoulder 27 projects laterally from said sleeve 26 intermediately of its ends and is designed to form a support for the clutch member now to be described. This clutch member comprises an annular drum-like member 21 having teeth 22 formed on one edge thereof which are adapted to engage the teeth 20 of the drum web 17 when said member 21 is moved longitudinally in one direction. This drum-like member 21 is provided on its inner face with an inwardly extending, centrally disposed annular web 23 arranged to encircle the sleeve 26 and spaced slightly therefrom to adapt it to be readily turned without engaging said sleeve. This web 23 is provided on its outer face with an annular inwardly opening pocket or socket member 25 which is adapted to fit over and engage the periphery of the annular flange or shoulder 27 carried by the sleeve 26 and which forms a support for the clutch member 21 and permits said member to rotate thereon. The member 21 is provided on its periphery preferably at the edge opposite the teeth 22 with a series of radially extending teeth 24 adapted to engage a lug 46 on a plate 29 hereinafter described. The sliding sleeve 26 is provided near its outer end with laterally extending oppositely disposed pins, as 28, for engagement by a plate 29 hereinafter described.

A spiral spring 38 is secured at one end to the inner face of the drum 16 and its other end 40 is secured to the rounded portion 14 of the shaft 10, preferably adjacent to the section 2 of the housing 1, the spring being preferably adapted to exert a tension equal to one-half a pound and is designed for controlling the rotation of said drum. A similar spring 41 is secured at one end to the inner face of the clutch member 21 and the other end thereof is secured to the sleeve 26 and is adapted to exert a tension approximately equal to about nine pounds.

The plate 29 shown in detail in Fig. 7 is arranged adjacent the inner face of the section 3 and provided at its lower end with a downwardly opening slot-like aperture 31 adapted to straddle and rest on the end 13 of the shaft 10. This plate 29 is provided with inwardly projecting lateral extensions 31' arranged on opposite sides of the aperture 31 and having slots 30 therein, inclined downwardly and outwardly and open at their outer ends. These slots 30 are adapted to engage the oppositely disposed pins 28 on the sleeve 26 for a purpose to be described. The longitudinally extending slot 32 is arranged at the upper end of said plate 29, near one side thereof and a transversely extending slot 33 is formed in said plate 29 at the upper end thereof near its opposite side and adapted to receive a rope guide to be described. This rope guide 34 shown in detail in Fig. 8 is provided with oppositely extending rounded arms 35 and 36 which project through the slots 32 and 33 in the plate 29 and are adapted to operate said plate as will be hereinafter described. This guide 34 is provided with an apertured head 37 set at an oblique angle to the body thereof and through which the operating rope 50 of the trolley is adapted to be passed, one end of said rope being secured to the drum 16, said rope being adapted to be wound on said drum.

The housing 1 is adapted to be mounted in one end of the car, preferably by means of arms 44 and 45 attached to the car and which are adapted to extend through the looped extensions 8 and 9, above described.

The operation of this improved trolley retriever will be readily understood upon examining the accompanying drawings and in connection with the foregoing description. When an operator is adjusting the trolley, the clutch member 21 will be held out of engagement with the teeth 20 of the drum 16 by the sliding plate 29 which engages the studs 28 on the sleeve 26 and the tension of the spring 38 is exerted to normally rotate the drum 16 on the shaft 10 to cause said drum to take up all loose rope due to the adjusting or positioning of the trolley on its wire. Should a trolley suddenly jump its wire, the rope guide 34 will be jerked slightly upward and this upward movement will raise the sliding plate 29 and the slotted arms 31' thereof engaging the pins 28 of the sliding sleeve 26 will move said sleeve inwardly bringing the teeth 20 of drum 16 into engagement with the teeth 22 of the clutch 21 and disengaging the pin 46 of plate 29 from the teeth 24 of the clutch member 21, as shown in Fig. 3. The result of this movement will be that the spring 41 will exert its tension against the trolley pole and rotate the drum 16 on the shaft 10 thereby winding the rope of the trolley and bringing said trolley into contact with or slightly above the roof of the trolley car.

All of the clutch mechanism of my improved trolley retriever with the exception of the rope guide on the sliding plate is mounted on the shaft 10 and inclosed by the drum 16 so that the same will not interfere with the winding of a trolley rope on the drum. This arrangement prevents the rope from becoming entangled with the clutch operating mechanism and assures a uniform movement of my improved retriever under all circumstances. When the trolley is in its normal position, the rope guide 34 will be positioned at right angles to the sliding plate 29 and when in this position, it will force said sliding plate by means of the arm 36 extending through the slot 33 downwardly on the shaft 10, thereby positively holding the clutch member 21 out of engaging position with the drum 16, as shown in Fig. 2. When in its normal position, the arm 36 of the rope guide 34 will occupy the outer end of the horizontal slot 33 and one of the extensions 35 will occupy the lower part of the slot 32. As the trolley jumps the wire, the rope guide 34 will move upwardly and the arm 36 of said guide will occupy the inner end of the slot 33 and the pivot arm 35 will occupy the lower end of the slot 32 and as the arms 35 are pivoted on the housing sections 2 and 3, the plate 29 will be moved in a vertical position.

Having thus described and ascertained the nature of my invention, what I claim as new and desire to secure by Letters-Patent is:—

1. In a trolley retriever, a housing, a shaft extending through the walls of the housing and secured therein, a drum rotatably mounted on the shaft, a rotary clutch mounted on the shaft and arranged to engage the drum, a sliding plate for operating the clutch and means for operating the sliding plate having connections with a trolley.

2. In a trolley retriever the combination of a spring actuated drum for initially controlling the trolley pole manipulating line, a spring rotatable clutch member, a vertically movable member connected to move said clutch member into engagement with said drum when operated in one direction, and a line guide engaged with said vertically movable member and having a head arranged at an oblique angle and provided with an aperture for the passage of the line therethrough and operable by an upward movement of the line to raise said member and move the clutch member into engagement with the drum.

3. In a trolley retriever, the combination of a housing, a shaft mounted in said housing, a drum rotatably mounted on said shaft, a sleeve slidably mounted on said shaft and provided with a laterally extending annular shoulder or flange, a projection extending laterally from said sleeve, a clutch rotatably mounted on said flange and adapted to be moved by said sleeve into engagement with the drum, a movable plate for engaging said sleeve, an arm extending laterally from said plate and having an obliquely arranged slot for engagement with said lateral projection on the sleeve, a rope guide pivotally mounted in the housing and connected with said plate, a spring connected with said drum and with said shaft, and a spring connected with the clutch and arranged to exert its tension on the drum when the clutch is engaged with said drum.

4. In a trolley retriever, the combination of a housing, a shaft mounted against rotation within the walls of said housing, a drum rotatably mounted on said shaft and provided with clutch teeth, a longitudinally movable sleeve mounted against rotation on said shaft and provided with a plurality of laterally extending lugs or projections, a clutch member supported by said sleeve and mounted to rotate relatively thereto, teeth on said clutch member adapted to engage the clutch teeth of the drum, a plate movable vertically in said housing and provided with arms having oblique slots arranged to engage the lugs of said sleeve for moving the clutch into and out of engagement with the clutch of the drum, a spring for controlling the movement of said drum; a spring for controlling the movement of the clutch and adapted to exert its tension on the drum when said clutch engages therewith, and a rope guide pivotally mounted on the housing and adapted to raise said plate.

5. In a trolley retriever, the combination of a housing, a shaft extending through said housing and mounted against rotation in the walls thereof, a drum rotatably mounted on said shaft and provided with clutch teeth, a sleeve mounted to slide on said shaft and held against rotation relatively thereto, an annular flange extending laterally from said sleeve, a clutch member rotatably mounted on said flange and provided with teeth for engaging the teeth of the drum, radially extending teeth arranged on the periphery of said clutch member, a vertically movable plate provided with a laterally extending stud for engagement with the radial teeth of said clutch member to hold it against rotation, means carried by said plate for engaging said sleeve to move the clutch member into and out of engagement with the drum, and a rope guide pivotally mounted on the housing and adapted to raise said plate.

6. In a trolley retriever, a housing formed with a plurality of looped extensions, a plurality of arms arranged to extend through said looped extensions and having means for connection with a car, and trolley controlling means arranged within said housing.

In testimony whereof I have hereunto set my hand in presence of two subscribing witnesses.

CHARLES PALM.

Witnesses:
HARRY G. CHAPMAN,
JOHN HANNON.